(12) United States Patent
Devenyi

(10) Patent No.: US 7,541,569 B1
(45) Date of Patent: Jun. 2, 2009

(54) POSITION SENSOR UTILIZING LIGHT EMISSIONS FROM A LATERAL SURFACE OF AN OPTICAL FIBER

(75) Inventor: Gabor Devenyi, Pentang (CA)

(73) Assignee: Raytheon Company, Waltham, MA (US)

( * ) Notice: Subject to any disclaimer, the term of this patent is extended or adjusted under 35 U.S.C. 154(b) by 1303 days.

(21) Appl. No.: 10/222,468

(22) Filed: Aug. 16, 2002

(51) Int. Cl.
*H01L 31/08* (2006.01)
*H01J 1/56* (2006.01)
*G01B 11/14* (2006.01)

(52) U.S. Cl. .............................. 250/214 PR; 250/229; 356/614

(58) Field of Classification Search ............ 250/227.11, 250/227.31, 231.1, 231.13–231.18, 214 PR, 250/229, 227, 31; 356/614–616, 621
See application file for complete search history.

(56) References Cited

U.S. PATENT DOCUMENTS

| | | | | |
|---|---|---|---|---|
| 5,376,785 A | * | 12/1994 | Chin et al. | ............ 250/214 PR |
| 5,389,777 A | * | 2/1995 | Chin | ............ 250/214 PR |
| 5,532,473 A | * | 7/1996 | Chin | ............ 250/214 PR |
| 5,625,459 A | * | 4/1997 | Driver | ............ 356/446 |

* cited by examiner

*Primary Examiner*—Thanh X Luu
(74) *Attorney, Agent, or Firm*—Haynes and Boone, LLP

(57) ABSTRACT

A position sensor includes a light source, and a light-emitting optical fiber having an insertion end that receives a light input from the light source, and a plurality of light emitters disposed along an emitting length of a lateral surface of a lateral surface of the light-emitting optical fiber. A light-collecting-and-detecting structure is operable to receive light from each of the plurality of light emitters of the light-emitting optical fiber. The light-collecting-and-detecting structure preferably includes a light detector, and a light-collecting optical fiber in a parallel but spaced-apart relation to the light-emitting optical fiber. The light-collecting optical fiber has an extraction end that provides a light output to the light detector, and a plurality of light collectors disposed along a collecting length of a lateral surface of the light-collecting optical fiber in a facing relation to the light emitters of the light-emitting optical fiber. An opaque light shield is disposed between and movable parallel relative to the light-emitting optical fiber and the light-collecting-and-detecting structure, so that a movement of the light shield progressively changes the number of light emitters that are exposed to the light-collecting-and-detecting structure.

23 Claims, 2 Drawing Sheets

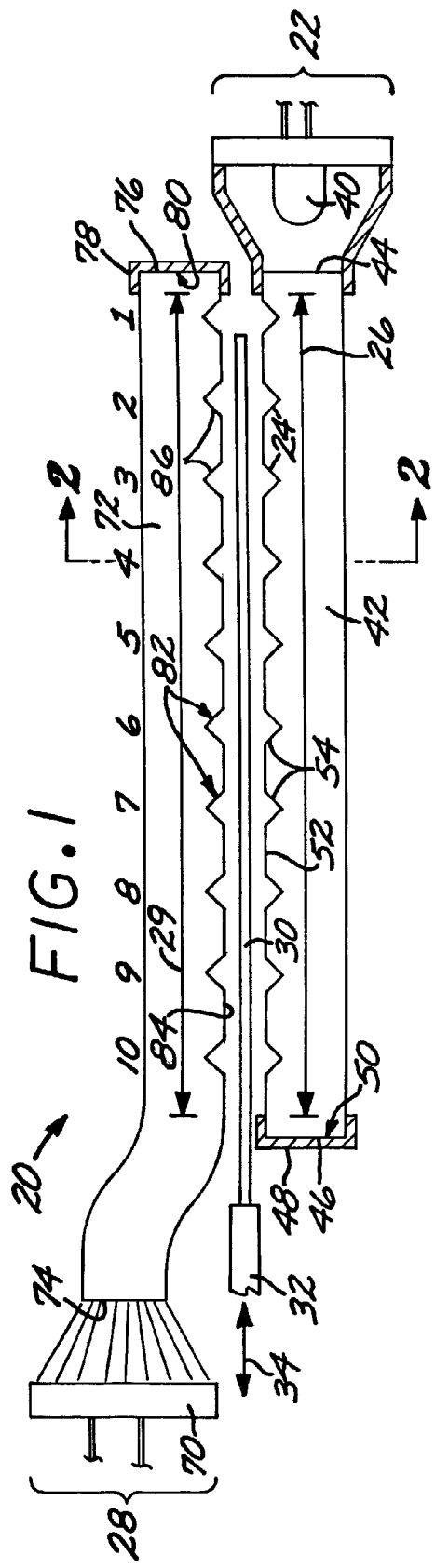

POSITION SENSOR UTILIZING LIGHT EMISSIONS FROM A LATERAL SURFACE OF AN OPTICAL FIBER

This invention relates to the measurement of the relative physical position of two articles and, more particularly, to an optical-fiber position sensor.

BACKGROUND OF THE INVENTION

There are many mechanical, electrical, and optical techniques for measuring the relative position of two articles. For example, a mechanical arm may be lengthened or shortened responsive to the movement of the articles. A change in an electrical property such as resistance or capacitance with relative position may be measured. Optical techniques such as light interference measurements or light attenuation in an attenuating medium are used when appropriate.

The available measurement techniques all have drawbacks in various applications. Mechanical measurement techniques impose loads on the system being measured, add substantial weight, are difficult to miniaturize, are difficult to provide with redundancy, and are subject to premature failures. Electrical measurement techniques are often limited to small changes in position, and are therefore not useful when the changes are on the order of many inches, feet, or more. They often require an exposed electrical contact, and usually at least a portion of the electrical measurement apparatus must move with the moving article so that the lead wires must also move. Electrical measurements also suffer from a high sensitivity to the environment of the sensor and to alignment errors. Optical position-measurement techniques typically require a line of sight between the articles, and are extremely sensitive to misalignment.

There is a need for an improved technique for measuring the relative position of two articles which overcomes these drawbacks. The present invention fulfills this need, and further provides related advantages.

SUMMARY OF THE INVENTION

The present invention provides a position sensor of the relative position between two objects that is based on the use of optical fiber technology. The position sensor is of low cost and high reliability, and is easy to miniaturize. In some embodiments, there are no moving optical components, so no mechanical, electrical, or optical linkages to the moving article are required. The approach is insensitive to misalignment within normal tolerances. There is no additional mechanical loading to the moving article resulting from the position sensor.

In accordance with the invention, a position sensor comprises a light source such as a light-emitting diode, a light-emitting optical fiber having an insertion end that receives a light input from the light source, and a plurality of light emitters disposed along an emitting length of a lateral surface of the light-emitting optical fiber. The position sensor further includes a light detector, a light-collecting optical fiber in a parallel but spaced-apart relation to the light-emitting optical fiber and having an extraction end that provides a light output to the light detector, and a plurality of light collectors disposed along a collecting length of a lateral surface of the light-collecting optical fiber in a facing relation to the respective light emitters of the light-emitting optical fiber. An opaque light shield is disposed between and is movable parallel relative to the light-emitting optical fiber and the light-collecting optical fiber.

In one form, the light-emitting optical fiber and the light-collecting optical fiber—the optical components—may be made stationary, and the opaque shield may be affixed to the movable element of a structure. This embodiment is preferred, as all of the elements requiring a light connection or electrical connection may be made stationary, and there is no concern with making electrical and light connections to the moving element of the structure. Conversely and equivalently from the functional standpoint, the light-emitting optical fiber and the light-collecting optical fiber may be affixed to the movable element of the structure, and the opaque shield may be made stationary.

The light emitters and light collectors may be of any operable form. The light emitters may be, for example, emitting notches or roughened emitting surfaces in the light-emitting optical fiber. The light collectors may be collecting notches or roughened surfaces in the light-collecting optical fiber. The use of a notch as the emitter provides an incremental indication of position, while the use of a roughened surface may be used to provide a continuous indication of position. Additional light-emitting optical fibers or light-collecting optical fibers may be provided to increase the measurable light intensity, or to increase the resolution in the case of a notched structure by displacing the notches of adjacent optical fibers of the same type slightly longitudinally.

Desirably, the light-emitting optical fiber has an internally reflective second end remote from the insertion end, and the light-collecting optical fiber has an internally reflective second end remote from the extraction end.

Stated alternatively, a position sensor comprises a light source, a light-emitting optical fiber as described, a light-collecting-and-detecting structure operable to receive light from each of the plurality of light emitters of the light-emitting optical fiber, and an opaque light shield disposed between and movable parallel relative to the light-emitting optical fiber and the light-collecting-and-detecting structure. A movement of the light shield progressively changes the number of light emitters that are exposed to the light-collecting-and-detecting structure. Features described elsewhere in may be used in conjunction with this embodiment.

In another form, a position sensor comprises a light-source-and-light-emitting structure operable to emit light from each of a plurality of light emitters disposed along an emitting length, a light detector, a light-collecting optical fiber as described in a parallel but spaced-apart relation to the light-source-and-light-emitting structure, and an opaque light shield disposed between and movable parallel relative to the light-source-and-light emitting structure and the light-collecting optical fiber. A movement of the light shield relative to the light-source-and-light emitting structure progressively changes the number of light emitters that are exposed to the light-collecting optical fiber. Features described elsewhere herein may be used in conjunction with this embodiment.

The position sensor of the invention is of low cost and high reliability. It may be readily scaled for emitting and collecting lengths, and may be made as large or as small as necessary. The only longitudinally extending components of the position sensor are the two optical fibers, which may each be less than 0.010 inch in diameter, and may be made smaller (or larger) if desired. These components may therefore be positioned in a small space on either side of the opaque shield. The two optical fibers may instead be larger diameter optical rods. The position sensor may be made with no moving optical components, by affixing the light shield to the moving element. Equivalently in an operating sense, the optical components may be affixed to the moving element. The present approach is relatively insensitive to maintaining a precise alignment between the optical fibers.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

BRIEF DESCRIPTION OF THE DRAWINGS

FIG. 1 is a schematic elevational view of a first embodiment of the position sensor;

FIG. 2 is a sectional view of the position sensor of FIG. 1, taken along line 2-2;

FIG. 3 is a graph of output of the light detector as a function of position of the opaque light shield, for the first embodiment of FIG. 1;

DETAILED DESCRIPTION OF THE INVENTION

Figure 4:
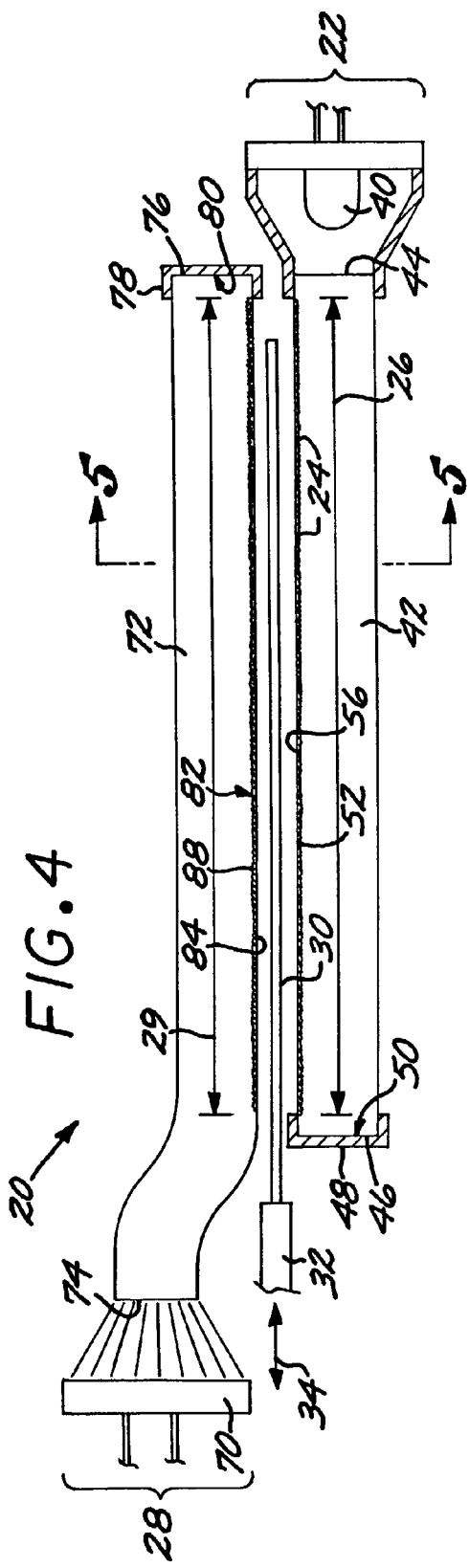
FIG. 4 is a schematic elevational view of a second embodiment of the position sensor.

FIGS. 1-2 and 4-5 depict embodiments of a position sensor 20. The position sensor 20 includes a light-source-and-light-emitting structure 22 operable to emit light from each of a plurality of light emitters 24 disposed along an emitting length 26. The position sensor 20 further includes a light-collecting-and-detecting structure 28 operable to receive light along a collecting length 29 from each of the plurality of light emitters 24 of the light-source-and-light-emitting structure 22. An opaque light shield 30 is disposed between and movable parallel relative to the light-source-and-light-emitting structure 22 and the light-collecting-and-detecting structure 28. As the opaque light shield 30 is moved to expose more of the light emitters 24, the light output of the light-collecting-and-detecting structure 28 changes and increases, producing a readout of the position of the opaque light shield 30 relative to the position of the light-source-and-light-emitting structure 22 and the light-collecting-and-detecting structure 28. In one form, the light-source-and-light-emitting structure 22 and the light-collecting-and-detecting structure 28 are stationary, and the opaque light shield 30 is affixed to a movable element 32 that is movable in a movement direction 34. This form is preferred, as no electrical or light connections need extend to the movable element 32. Equivalently from a functional standpoint, the light-source-and-light-emitting structure 22 and the light-collecting-and-detecting structure 28 may be affixed to the movable element, and the opaque light shield 30 may be stationary.

The light-source-and-light-emitting structure 22 includes a light source 40 such as a light-emitting diode, and a light-emitting optical fiber 42. The light-emitting optical fiber 42 has an insertion end 44 that receives a light input from the light source 40. Desirably, the light-emitting optical fiber 42 further includes a second end 46 remote from the insertion end 44, wherein the second end 46 of the light-emitting optical fiber 42 has an end cap 48 and is internally reflective due to a reflective coating 50 applied to the second end 46.

Figure 6:
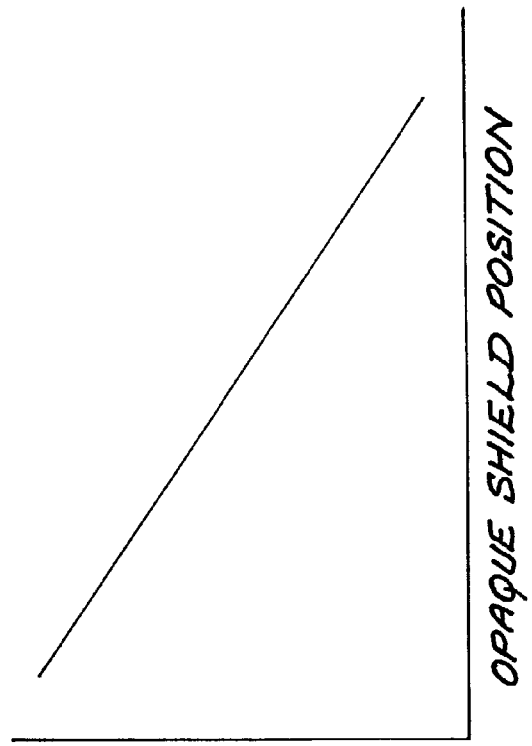
FIG. 6 is a graph of output of the light detector as a function of position of the opaque light shield, for the second embodiment of FIG. 4.
Figure 5:
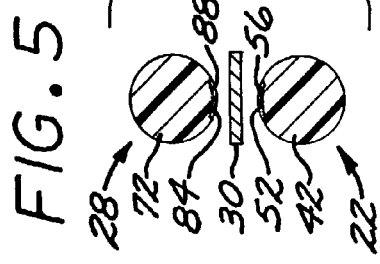
FIG. 5 is a sectional view of the position sensor of FIG. 4, taken along line 5-5.

The light-emitting optical fiber 42 includes the plurality of light emitters 24 disposed along the emitting length 26 of a lateral surface 52 of the light-emitting optical fiber 42. The lateral surface 52 is the side surface of the light-emitting optical fiber 42 between its ends 44 and 46. The light emitters 24 may be of any operable form, and two forms are of particular interest. In the embodiment of FIGS. 1-3, the light emitters 24 are notches 54 through the cladding of the light-emitting optical fiber 42, positioned to face the light-collecting-and-detecting structure 28. In the embodiment of FIGS. 4-6, the light emitters 24 are roughened regions 56 of the lateral surface 52 of light-emitting optical fiber 42, positioned to face the light-collecting-and-detecting structure 28. An optical fiber generally transmits light therethrough by total internal reflection and without substantial loss of light energy through the lateral surface. However, intentionally introduced imperfections such as the light emitters 24 interrupt the total internal reflection and cause light to be lost through the lateral surface 52 at the location of the imperfections, thereby serving as lateral-surface light emitters.

The light-collecting-and-detecting structure 28 includes a light detector 70 such as a photocell, and a light-collecting optical fiber 72 in a parallel but spaced-apart relation to the light-emitting optical fiber 42. The functionality of the position sensor 20 is tolerant of misalignments of the optical fibers 42 and 72, so that they need not be perfectly parallel. The light-collecting optical fiber 72 has an extraction end 74 that provides a light output to the light detector 70. Desirably, the light-collecting optical fiber 72 further includes a second end 76 remote from the extraction end 74, wherein the second end 76 of the light-collecting optical fiber 72 has an end cap 78 and is internally reflective due to a reflective coating 80 applied to the second end 76.

The light-collecting optical fiber 72 includes a plurality of light collectors 82 disposed along the collecting length 29 of a lateral surface 84 of the light-collecting optical fiber 72. The lateral surface 84 is the side surface of the light-collecting optical fiber 72 between its ends 74 and 76. The light collectors 82 may be of any operable form, and two forms are of particular interest. In the embodiment of FIGS. 1-3, the light collectors 82 are notches 86 through the cladding of the light-collecting optical fiber 81, positioned to face the respective notches 54 of the light-emitting optical fiber 42. In the embodiment of FIGS. 4-6, the light collectors 82 are roughened regions 88 of the lateral surface 84 of the light-collecting optical fiber 72, positioned to face the corresponding roughened regions 56 of the light-emitting optical fiber 42. The light collectors 82 function in a comparable but inverse manner to the light emitters 24, receiving light energy that is then transmitted along the length of the light-collecting optical fiber 72 to the light detector 70. The light emitters 24 and the light collectors 82 may be of the same type (e.g., both notches or both roughened regions) or of different types in any one embodiment. Additionally, some of the light emitters 24 may be notches and some may be roughened regions, and some of the light collectors 82 may be notches and some may be roughened regions.

Where the light emitters 24 and/or the light collectors are roughened regions, the roughened regions desirably extend only a small fraction around the circumference of the respective optical fiber, as for example no more than about 5-10 percent of the portion of the circumference that is facing the opposing optical fiber being roughened. If a greater fraction is roughened, there is an undesirably high light attenuation. The roughened region may be a continuous length along the respective optical fiber, resulting in a continuous emission or collection of light along the length, or it may be a series of short segments resulting in a discontinuous emission or collection of light along the length. As used herein, "roughened regions" are regions having imperfections that are relatively small as compared with the diameter of the optical fiber, to interrupt the total internal reflection of the optical fiber. Roughening may be accomplished by any operable approach that interrupts the total internal reflection, such as scratching, abrading, grit blasting, and the like.

The output of the light detector 70 is responsive to the position of the opaque light shield 30. The light output of the light detector 70 is illustrated schematically in FIGS. 3 and 6 for the respective embodiments of FIGS. 1-3 and 4-6.

The light output of the embodiment of FIGS. 1-3, illustrated in FIG. 3, which utilizes notched light emitters 24, is a step-function of light output as a function of the position of the opaque light shield 30. That is, when the opaque light shield 30 is in its rightmost position blocking all of the emitters 24, there is no light output. As the opaque light shield 30 is moved generally parallel to, and to the left relative to the light-source-and-light-emitting structure 22 and the light-collecting-and-detecting structure 28 in FIG. 1, the light emitters 24 are progressively uncovered, so that more light propagates through the light emitters 24 from the light-emitting optical fiber 42, to the light collectors 82 of the light-collecting optical fiber 72, and thence to the light detector 70. In this case the light output is a step function due to the discrete nature of the notches 54. In the illustrated embodiment ten notches 54 are illustrated, and the corresponding ten steps in FIG. 3 are depicted. The width of the steps may be varied by making the notches 54 closer together or farther apart. This stepped light output is useful, for example, in applications where the objective is to position the movable element 32 at any of a series of discrete stepped locations.

The light output of the embodiment of FIGS. 4-6, illustrated in FIG. 6 and which utilizes the roughened region 56 that is continuous along the length of the light-emitting optical fiber 42 and the roughened region 88 that is continuous along the length of the light-collecting optical fiber 72, varies continuously as a function of the position of the opaque light shield 30. This embodiment otherwise functions in the same manner as described for the embodiment of FIGS. 1-3, which discussion is incorporated here.

Although the steps of FIG. 3 are illustrated as regular and the slope of the line in FIG. 6 is illustrated to be straight, there may be some variation from these ideal results. That variation does not pose a problem as long as it is repeatable, because the relations of FIGS. 3 and 6 may be calibrated and stored in a look-up table.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A position sensor comprising
    a light source;
    a light-emitting optical fiber having
        an insertion end that receives a light input from the light source, and
        a plurality of light emitters disposed along an emitting length of a lateral surface of the light-emitting optical fiber;
    a light detector;
    a light-collecting optical fiber in a parallel but spaced-apart relation to the light-emitting optical fiber and having
        an extraction end that provides a light output to the light detector, and
        a plurality of light collectors disposed along a collecting length of a lateral surface of the light-collecting optical fiber in a facing relation to the respective light emitters of the light-emitting optical fiber; and
    an opaque light shield disposed between and movable parallel relative to the light-emitting optical fiber and the light-collecting optical fiber.

2. The position sensor of claim 1, wherein the light source is a light-emitting diode.

3. The position sensor of claim 1, wherein at least some of the light emitters are emitting notches in the light-emitting optical fiber.

4. The position sensor of claim 1, wherein at some of the light collectors are collecting notches in the light-collecting optical fiber.

5. The position sensor of claim 1, wherein at least some of the light emitters are roughened emitting surfaces on the light-emitting optical fiber.

6. The position sensor of claim 1, wherein at least some of the light collectors are roughened collecting surfaces on the light-collecting optical fiber.

7. The position sensor of claim 1, wherein the light-emitting optical fiber comprises
    a second end remote from the insertion end, wherein the second end of the light-emitting optical fiber is internally reflective.

8. The position sensor of claim 1, wherein the light-collecting optical fiber comprises
    a second end remote from the extraction end, wherein the second end of the light-collecting optical fiber is internally reflective.

9. A position sensor comprising
    a light source;
    a light-emitting optical fiber having
        an insertion end that receives a light input from the light source, and
        a plurality of light emitters disposed along an emitting length of a lateral surface of the light-emitting optical fiber;
    a light-collecting-and-detecting structure operable to receive light from each of the plurality of light emitters of the light-emitting optical fiber; and
    an opaque light shield disposed between and movable parallel relative to the light-emitting optical fiber and the light-collecting-and-detecting structure, so that a movement of the light shield progressively changes the number of light emitters that are exposed to the light-collecting-and-detecting structure.

10. The position sensor of claim 9, wherein each of the light emitters is an emitting notch in the light-emitting optical fiber.

11. The position sensor of claim 9, wherein each of the light emitters is a roughened emitting surface on the light-emitting optical fiber.

12. The position sensor of claim 9, wherein the light-collecting-and-detecting structure comprises a light-collecting optical fiber.

13. The position sensor of claim 9, wherein the light-collecting and detecting structure comprises
    a light detector, and
    a light-collecting optical fiber in a parallel but spaced-apart relation to the light-emitting optical fiber and having
        an extraction end that provides a light output to the light detector, and
        a plurality of light collectors disposed along a collecting length of a lateral surface of the light-collecting optical fiber in a facing relation to the light emitters of the light-emitting optical fiber.

14. The position sensor of claim 13, wherein each of the light collectors is a collecting notch in the light-collecting optical fiber.

15. The position sensor of claim 13, wherein each of the light collectors is a roughened collecting surface on the light-collecting optical fiber.

16. A position sensor comprising
a light-source-and-light-emitting structure operable to emit light from each of a plurality of light emitters disposed along an emitting length;
a light detector;
a light-collecting optical fiber in a parallel but spaced-apart relation to the light-source-and-light-emitting structure and having
an extraction end that provides a light output to the light detector, and
a plurality of light collectors disposed along a collecting length of a lateral surface of the light-collecting optical fiber in a facing relation to the respective light emitters of the light-source-and-light-emitting structure; and
an opaque light shield disposed between and movable parallel relative to the light-source-and-light emitting structure and the light-collecting optical fiber, so that a movement of the light shield relative to the light-source-and-light emitting structure progressively changes the number of light emitters that are exposed to the light-collecting optical fiber.

17. The position sensor of claim 16, wherein the light-source-and-light-emitting structure comprises a light-emitting optical fiber.

18. The position sensor of claim 16, wherein each of the light emitters is an emitting notch in a light-emitting optical fiber.

19. The position sensor of claim 16, wherein each of the light emitters is a roughened emitting surface on a light-emitting optical fiber.

20. The position sensor of claim 16, wherein the light-source-and-light-emitting structure comprises
a light source, and
a light-emitting optical fiber in a parallel but spaced-apart relation to the light-collecting optical fiber and having
an insertion end that receives a light output from the light source, and
a plurality of light emitters disposed along an emitting length of a lateral surface of the light-emitting optical fiber in a facing relation to the light collectors of the light-collecting optical fiber.

21. The position sensor of claim 20, wherein each of the light emitters is an emitting notch in the light-emitting optical fiber.

22. The position sensor of claim 20, wherein each of the light emitters is a roughened collecting surface on the light-emitting optical fiber.

23. A position sensor comprising
a light source;
a light-emitting optical fiber having
an insertion end that receives a light input from the light source, and
a plurality of light emitters disposed along an emitting length of a lateral surface of the light-emitting optical fiber, wherein at least some of the light emitters are roughened emitting surfaces on the light-emitting optical fiber, wherein no more than 10 percent of the portion of the circumference of the light-emitting optical fiber that is facing the light-collecting optical fiber is roughened;
a light detector;
a light-collecting optical fiber in a parallel but spaced-apart relation to the light-emitting optical fiber and having
an extraction end that provides a light output to the light detector, and
a plurality of light collectors disposed along a collecting length of a lateral surface of the light-collecting optical fiber in a facing relation to the respective light emitters of the light-emitting optical fiber; and
an opaque light shield disposed between and movable parallel relative to the light-emitting optical fiber and the light-collecting optical fiber.

* * * * *